(12) United States Patent
Hasting et al.

(10) Patent No.: US 10,941,849 B2
(45) Date of Patent: Mar. 9, 2021

(54) GEAR ASSEMBLY DAMPER ARRANGEMENT

(71) Applicant: General Electric Company, Schenectady, NY (US)

(72) Inventors: William Howard Hasting, Cincinnati, OH (US); Joseph Robert Dickman, Monroe, OH (US)

(73) Assignee: General Electric Company, Schenectady, NY (US)

(*) Notice: Subject to any disclaimer, the term of this patent is extended or adjusted under 35 U.S.C. 154(b) by 59 days.

(21) Appl. No.: 15/667,870

(22) Filed: Aug. 3, 2017

(65) Prior Publication Data

US 2019/0040943 A1 Feb. 7, 2019

(51) Int. Cl.
*F16H 57/00* (2012.01)
*F16H 57/08* (2006.01)
(Continued)

(52) U.S. Cl.
CPC ......... *F16H 57/0006* (2013.01); *F16C 19/22* (2013.01); *F16C 33/58* (2013.01); *F16C 33/583* (2013.01); *F16H 1/28* (2013.01); *F16H 55/14* (2013.01); *F16H 57/00* (2013.01); *F16H 57/08* (2013.01); *F16H 57/082* (2013.01); *F02C 7/36* (2013.01); *F05D 2260/40311* (2013.01); *F05D 2260/96* (2013.01); *F16C 19/28* (2013.01); *F16C 2326/43* (2013.01);
(Continued)

(58) Field of Classification Search
CPC ............... F16H 57/0006; F16H 55/14; F16H 2057/085; F16H 57/00; F16H 57/08; F16H 57/082; F16H 1/28; F01D 25/164; F16C 19/22; F16C 19/28; F16C 33/58; F16C 33/583; F16C 2326/43; F16C 2360/23; F16C 2361/61; F02C 7/36; F05D 2260/40311; F05D 2260/96
See application file for complete search history.

(56) References Cited

U.S. PATENT DOCUMENTS

| | | | |
|---|---|---|---|
| 2,449,943 A * | 9/1948 | Johnson | B21K 25/00 29/898.063 |
| 3,652,139 A | 3/1972 | Memery | |

(Continued)

FOREIGN PATENT DOCUMENTS

| | | |
|---|---|---|
| DE | 10 2010 045 305 A1 | 3/2012 |
| DE | 10 2012 202 247 A1 | 8/2013 |

(Continued)

OTHER PUBLICATIONS

Machine Elements in Mechanical Design, 2nd edition by Robert L. Mott, copyright 1992, pp. 599-600 (Year: 2020).*
(Continued)

*Primary Examiner* — Tisha D Lewis
(74) *Attorney, Agent, or Firm* — McGarry Bair PC

(57) ABSTRACT

A planetary gear system can include a sun gear, an outer ring gear, and at least one planet gear driving the sun gear and planet gear. The planet gear can include an inner ring having an inner race, an outer ring having an outer race circumscribing and confronting the inner race. A plurality of rolling elements can be located between and in contact with the inner and outer races, which can include least one damper.

20 Claims, 4 Drawing Sheets

WITH DAMPER RINGS

(51) Int. Cl.
*F16H 1/28* (2006.01)
*F16H 55/14* (2006.01)
*F16C 19/22* (2006.01)
*F16C 19/28* (2006.01)
*F16C 33/58* (2006.01)
*F02C 7/36* (2006.01)

(52) U.S. Cl.
CPC ...... *F16C 2360/23* (2013.01); *F16C 2361/61* (2013.01); *F16H 2057/085* (2013.01)

(56) References Cited

U.S. PATENT DOCUMENTS

| | | | |
|---|---|---|---|
| 4,781,077 A | 11/1988 | El-Sahfei | |
| 5,730,531 A | 3/1998 | Pinkos et al. | |
| 8,118,540 B2 | 2/2012 | Cloarec | |
| 8,182,153 B2* | 5/2012 | Singh | F01D 25/164 |
| | | | 384/477 |
| 8,360,927 B2 | 1/2013 | Murata et al. | |
| 8,573,922 B2 | 11/2013 | Milfs | |
| 9,021,910 B2 | 5/2015 | Altr et al. | |
| 9,677,659 B1* | 6/2017 | Niergarth | F02C 7/36 |
| 9,926,975 B2* | 3/2018 | Smedresman | F16C 27/045 |
| 10,113,633 B2* | 10/2018 | Niergarth | F02C 7/36 |
| 10,234,018 B2 | 3/2019 | Hasting et al. | |
| 10,480,572 B2* | 11/2019 | Smedresman | F01D 25/164 |
| 2005/0026743 A1 | 2/2005 | O'Leary et al. | |
| 2009/0214347 A1 | 8/2009 | Cloarec | |
| 2010/0292043 A1* | 11/2010 | Tao | F16H 57/028 |
| | | | 475/344 |
| 2012/0003096 A1* | 1/2012 | Nakashima | F03D 15/10 |
| | | | 416/170 R |
| 2012/0208669 A1 | 8/2012 | Nakashima et al. | |
| 2015/0197280 A1 | 7/2015 | Arlt et al. | |
| 2015/0233293 A1* | 8/2015 | Grogg | F02C 7/06 |
| | | | 248/562 |
| 2015/0308507 A1* | 10/2015 | Kanamoto | F16J 15/3276 |
| | | | 384/484 |
| 2016/0097331 A1 | 4/2016 | Venter et al. | |

FOREIGN PATENT DOCUMENTS

| | | | | |
|---|---|---|---|---|
| EP | 1 099 882 A2 | | 5/2001 | |
| JP | 63231036 A | * | 9/1988 | ........... F16H 1/2836 |
| JP | H03107614 A | | 5/1991 | |
| JP | 2001065584 A | * | 3/2001 | ........... F16C 35/067 |
| JP | 2012145084 A | * | 8/2012 | ........... F01L 1/352 |
| JP | 2017078510 A | | 4/2017 | |

OTHER PUBLICATIONS

Retaining Rings Technical Manual by Peterson Spring, published Nov. 18, 2015, pp. 4-19 (Year: 2020).*
Machine translation of JPH03107614A, filed Jul. 21, 2020 (Year: 2020).*
Machine translation of JP2001065584A, filed Jul. 21, 2020 (Year: 2020).*
Partial Search Report and Opinion issued in connection with corresponding EP Application No. 18186025.5 dated Nov. 23, 2018.
Canadian Office Action issued in connection with corresponding Canadian Application No. 3011866 dated Mar. 25, 2019.
Japanese Patent Office, First Office Action re Japanese Patent Application No. 2018-145509, dated Oct. 1, 2019, 4 pages, Japan.

* cited by examiner

NO DAMPER RINGS

WITH DAMPER RINGS

GEAR ASSEMBLY DAMPER ARRANGEMENT

BACKGROUND OF THE INVENTION

Turbine engines, and particularly gas or combustion turbine engines, are rotary engines that extract energy from a flow of combusted gases passing through the engine onto a multitude of rotating turbine blades.

A turbine can rotationally drive a turbine shaft, which can rotationally drive a fan through a power gearbox of an epicyclic gearing arrangement. The power gearbox can rotatably support a sun gear disposed centrally with respect to a ring gear and a plurality of planet gears, which are disposed around the sun gear and engage between the sun gear and the ring gear. Each planet gear meshes with the sun gear and with the ring gear. Each planet gear is rotatable on its own rolling element within an outer race. When planet gears are operated at undesired frequencies, the plant gears can be susceptible to mode failures from deformation and dynamic overloads.

BRIEF DESCRIPTION OF THE INVENTION

In one aspect, the present disclosure relates to a gear assembly including an inner ring having an exterior surface defining an inner race, an outer ring having an outer surface with a plurality of teeth and an inner surface defining an outer race circumscribing and confronting the inner race. A plurality of rolling elements are located between and in contact with the inner and outer races, and at least one damper ring provided on at least one of the inner and outer ring.

In another aspect, the present disclosure relates to a planetary gear system, including a sun gear having a plurality of teeth, an outer ring gear having a plurality of teeth, and at least one planet gear in mesh with the sun gear and ring gear. The planet gear includes an inner ring having an outer surface defining an inner race and an outer ring having an outer surface with a plurality of teeth and an inner surface defining an outer race circumscribing and confronting the inner race. A plurality of rolling elements are located between and in contact with the inner and outer races and at least one damper ring provided on at least one of the inner and outer ring.

DETAILED DESCRIPTION OF THE INVENTION

Figure 1:
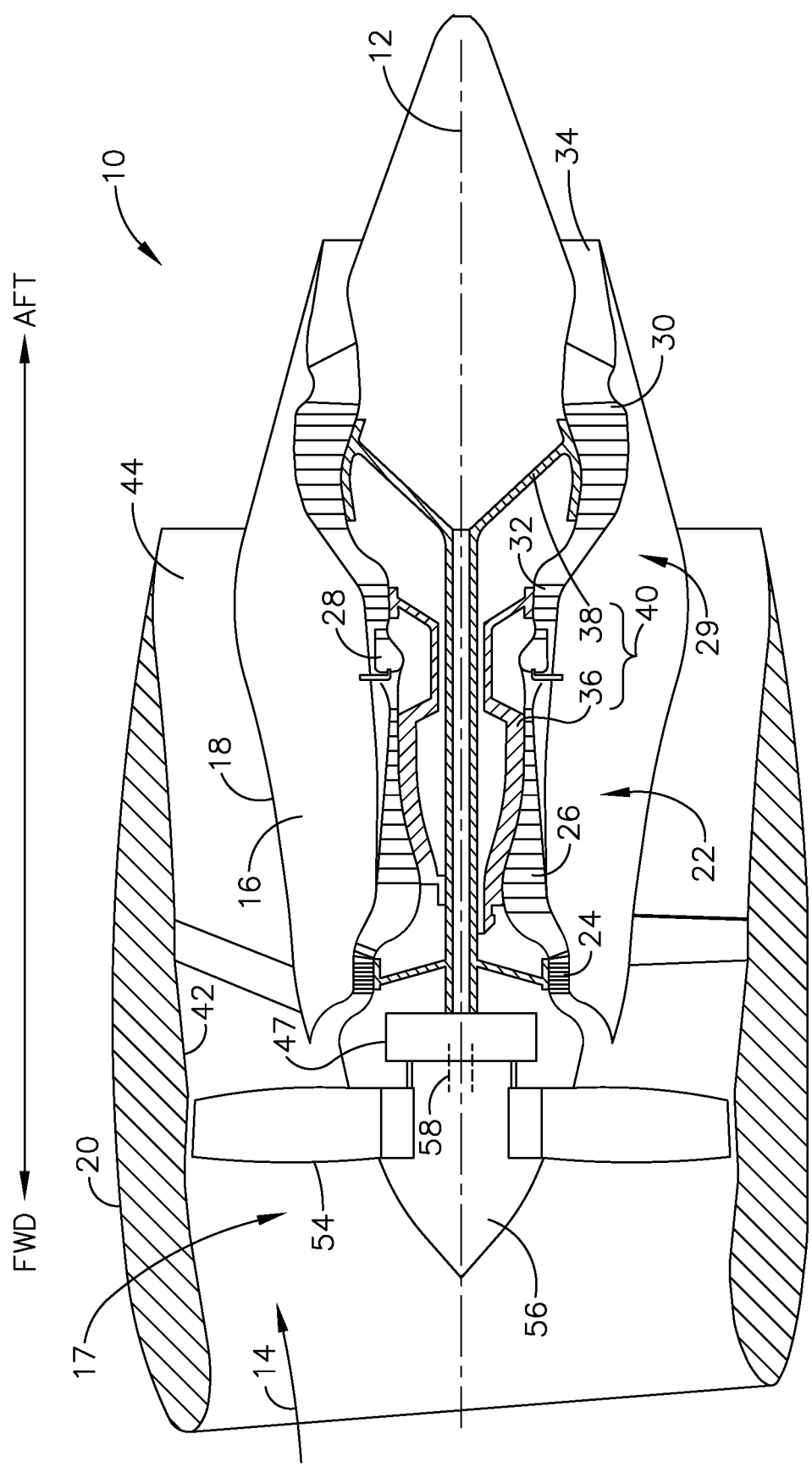
FIG. 1 is a schematic cross-sectional diagram of a gas turbine engine for an aircraft.

Aspects of the disclosure described herein are directed to a damper for an epicyclic gear system. For purposes of illustration, the present disclosure will be described with respect to the turbine for an aircraft gas turbine engine. It will be understood, however, that aspects of the disclosure described herein are not so limited and may have general applicability within an engine, including compressors, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component. Additionally, as used herein, the terms "radial" or "radially" refer to a dimension extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a portion of a turbine engine 10 for an aircraft. The turbine engine 10 has a longitudinally extending axis or centerline 12 extending from forward (FWD) to aft (AFT). A flow path 14 can be defined along the longitudinal axis 12. A turbine engine core 16, a fan assembly 17, and a nacelle 20 can be included in the turbine engine 10. The turbine engine core 16 can include a compressor section 22 having low pressure (LP) and high pressure (HP) compressor(s) 24, 26, a combustion section 28, a turbine section 29 having low pressure (LP) and high pressure (HP) turbine(s) 30, 32, and exhaust section 34. An inner core cowl 18, sometimes referred to as a shroud, radially surrounds the turbine engine core 16.

A high pressure (HP) shaft or spool 36 is disposed coaxially about the centerline 12 of the engine 10 drivingly connects the HP turbine 32 to the HP compressor 26. A low pressure (LP) shaft or spool 38, is disposed coaxially about the centerline 12 of the engine 10 within the larger diameter annular HP spool 36, drivingly connects the LP turbine 30 to the LP compressor 24. The spools 36, 38 are rotatable about the engine centerline 12 and couple to a plurality of rotatable blades or elements, which can collectively define and is hereinafter referred to as the engine rotor 40.

A nacelle 20 surrounds the engine 10 including the inner core cowl 18. In this manner, the nacelle 20 forms an outer cowl 42 radially surrounding the inner core cowl 18. The outer cowl 42 is spaced from the inner cowl 18 to form an annular passage 44 between the inner core cowl 18 and the outer cowl 42. The annular passage 44 can be a bypass duct, permitting a portion an airflow along the flow path 14 to bypass the engine core 16. The annular passage 44 characterizes and forms a generally forward-to-aft bypass airflow path.

Fan assembly 17 generally has a plurality of fan blades 54 coupled to a spinner 56 in a spaced apart manner. The fan blades 54 extend outwardly from the spinner 56 in a generally radial direction. Each fan blade 54 is rotatable relative to the spinner 56 about the longitudinal axis 12 via a fan shaft 58 that is driven by the LP spool 38 via a power gearbox 47. The power gearbox 47 includes a gear assembly having a plurality of gears for adjusting the rotational speed of the fan shaft 58 and thus the fan 52 relative to the LP spool 38.

Figure 2:
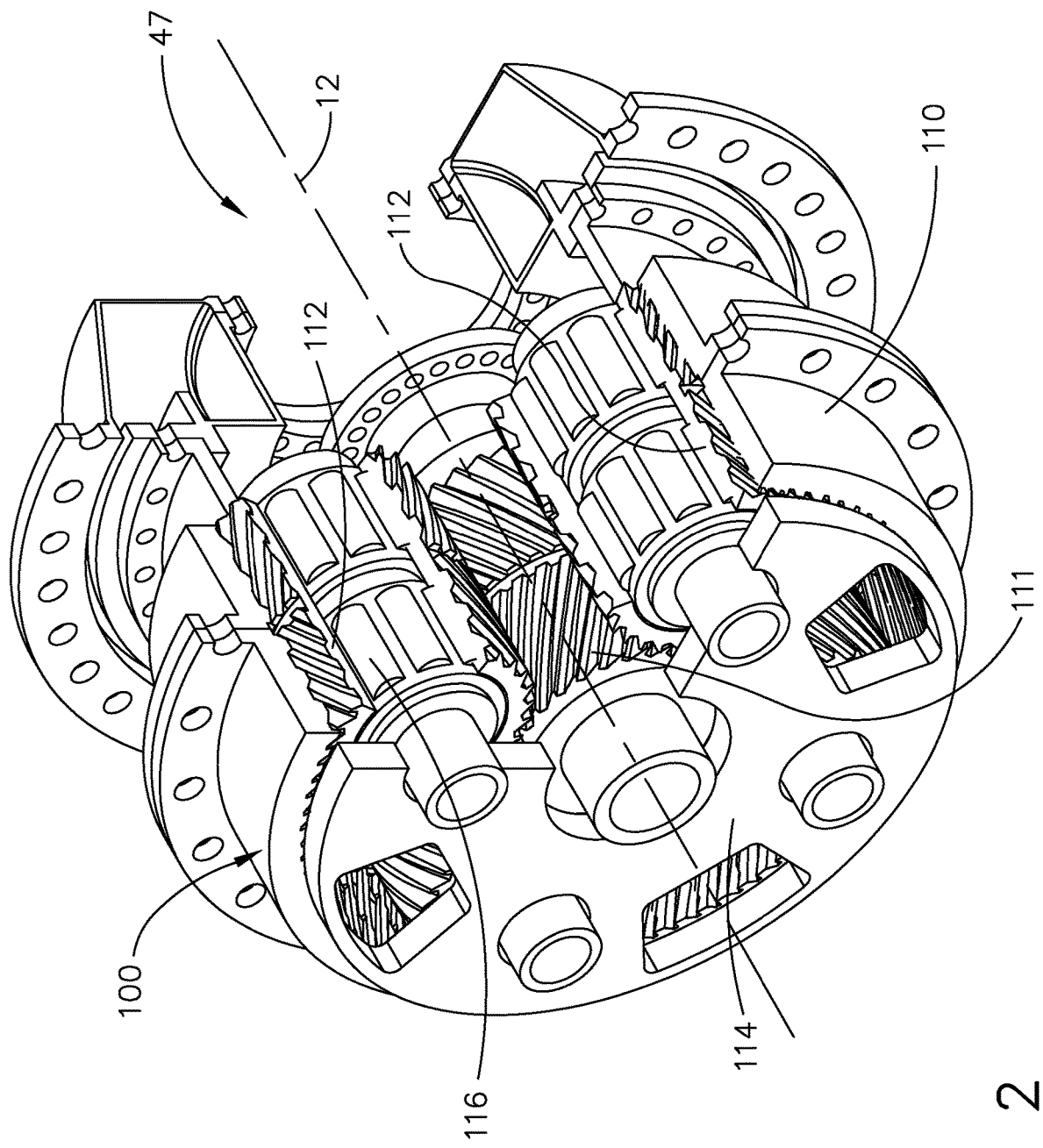
FIG. 2 is a perspective view of a gear assembly for the gas turbine engine in FIG. 1.

FIG. 2 illustrates an exemplary gear assembly 100 for a power gearbox 47 which can be any epicyclic gear assembly commonly known in the art. The gear assembly 100 can include a centrally-located sun gear 111 that is rotatable about the centerline 12. One or more planet gears 112 can surround and engage, or mesh, with the sun gear 111. The gear assembly 100 can further include a ring gear 110 disposed circumferentially around the sun gear 111 and planet gears 112 and engages with the planet gears 112. Collectively the sun gear 111, the planet gears 112, and the ring gear 110 are housed by carrier 114 and constitute the gear assembly 100 associated with the power gearbox 47.

Figure 3:
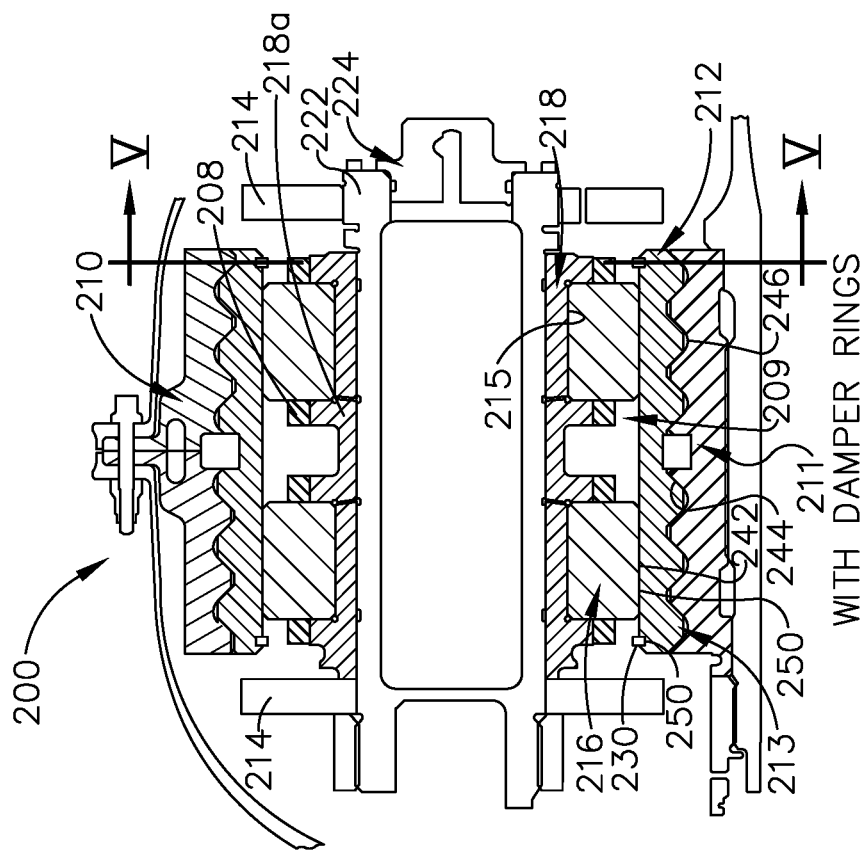
FIG. 3 is a partial cross-sectional view of a planetary gear for the gear assembly of FIG. 2.

FIG. 3 depicts a partial cross-sectional view of a planet gear 112 housed in the gear assembly 100. The planet gear 112 is housed by carrier 114 and generally has an outer ring 113 rotatable about planet rolling elements 116. There can be multiple rows of roller elements 116 carried by each planet gear. The outer ring 113 can include an outer surface 144 with a plurality of teeth 146 and an inner surface 142 that defines an outer race for the rolling elements 116. The planet gear 112 also comprises an inner ring 118 having an outer surface 115 defining an inner race for the rolling elements 116. The rolling elements 116, therefore, can be located between and in contact with the inner race of the inner ring 118 and the outer race of the outer ring 113. A pair of static shoulder elements 118a on the inner ring 118 can oppose the rolling elements 116. Cage elements 108 in an opening 109 can rotate with and define a cage, or support structure for guiding the rolling elements 116. The cage elements 108 can abut the outer surface 115 of the inner ring 118. A plurality of rolling elements 116 can be located in the cage such that the cage elements 108 guide the multiple rows of rolling elements 116. A support shaft 122 supports and carries the inner ring 118 and is connected by a spanner nut configuration 124 to the carrier 114 to hold the planet gear 112 within the carrier 114.

While FIG. 3 illustrates one configuration for housing a planet gear 112 to a carrier 114 of a gear assembly 100, there are generally many gear assembly configurations known in the art and embodiments described herein can be applicable to any configuration of a gear assembly. Moreover, while FIG. 3 illustrates the planet gear 112 having two rows of rolling elements 116, it is possible that the planet gear 112 includes only one, or more than two rows of rolling elements 116. The rolling elements 116 can be any suitable rolling elements such as cylindrical bearings, spherical bearings, ball bearings, or fluid-film journal bearings.

Figure 4:
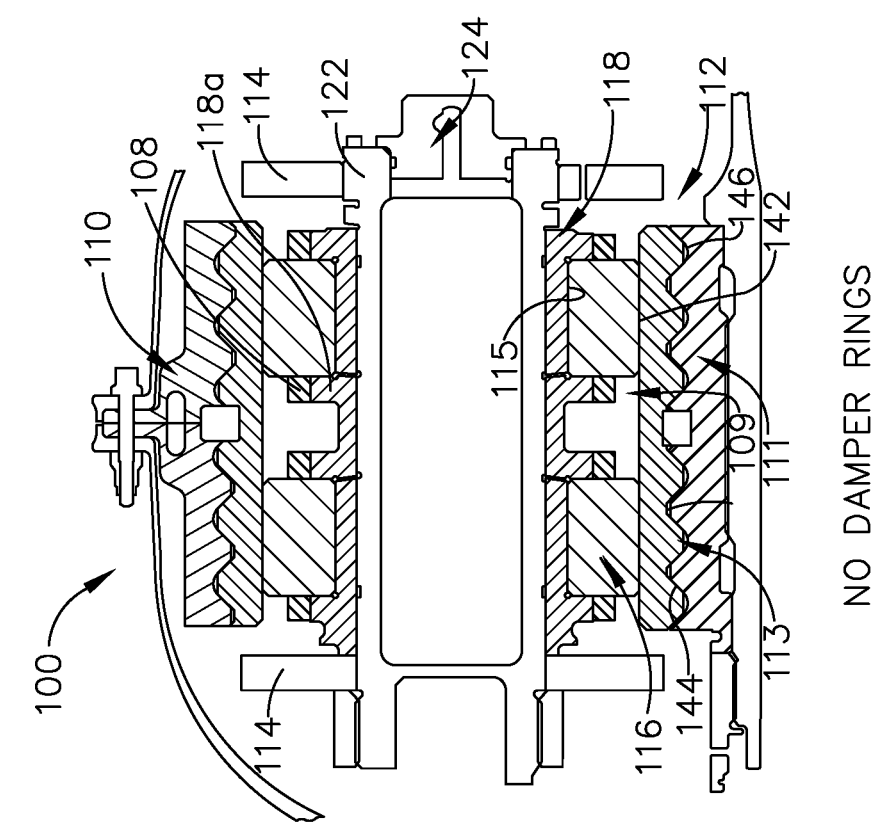
FIG. 4 is a partial cross-sectional view of a planetary gear according to aspects described herein.

FIG. 4 illustrates a gear assembly 200 similar in structure to the gear assembly 100, but with the addition a damper in the form of a damper ring 230 engaging the outer ring 213. Since the gear assembly 200 is similar to the gear assembly 100; like parts will be identified with like numerals increased by 100, with it being understood that the description of the like parts of gear assembly 100 applies to gear assembly 200, unless otherwise noted. The damper ring 230 can be mounted to the inner surface 242 of the outer ring 213 of the planet gear 212, which meshes with ring gear 210, and can be frictionally slidable relative to the inner surface 242. A groove 250 can be provided in the inner surface 242 to receive the damper ring 230 and can be in the form of an L-shape (not shown). While the groove 250 is shown on the inner surface 242, it is contemplated that the groove 250 can also be provided in a side of the outer ring 213, which can be in-between the inner surface 242 and the outer surface 244 of the outer ring 213 and facing the carrier 214. In such an arrangement the damper ring 230 could be provided in the groove 250 for engaging and damping the outer ring 213.

Figure 5:
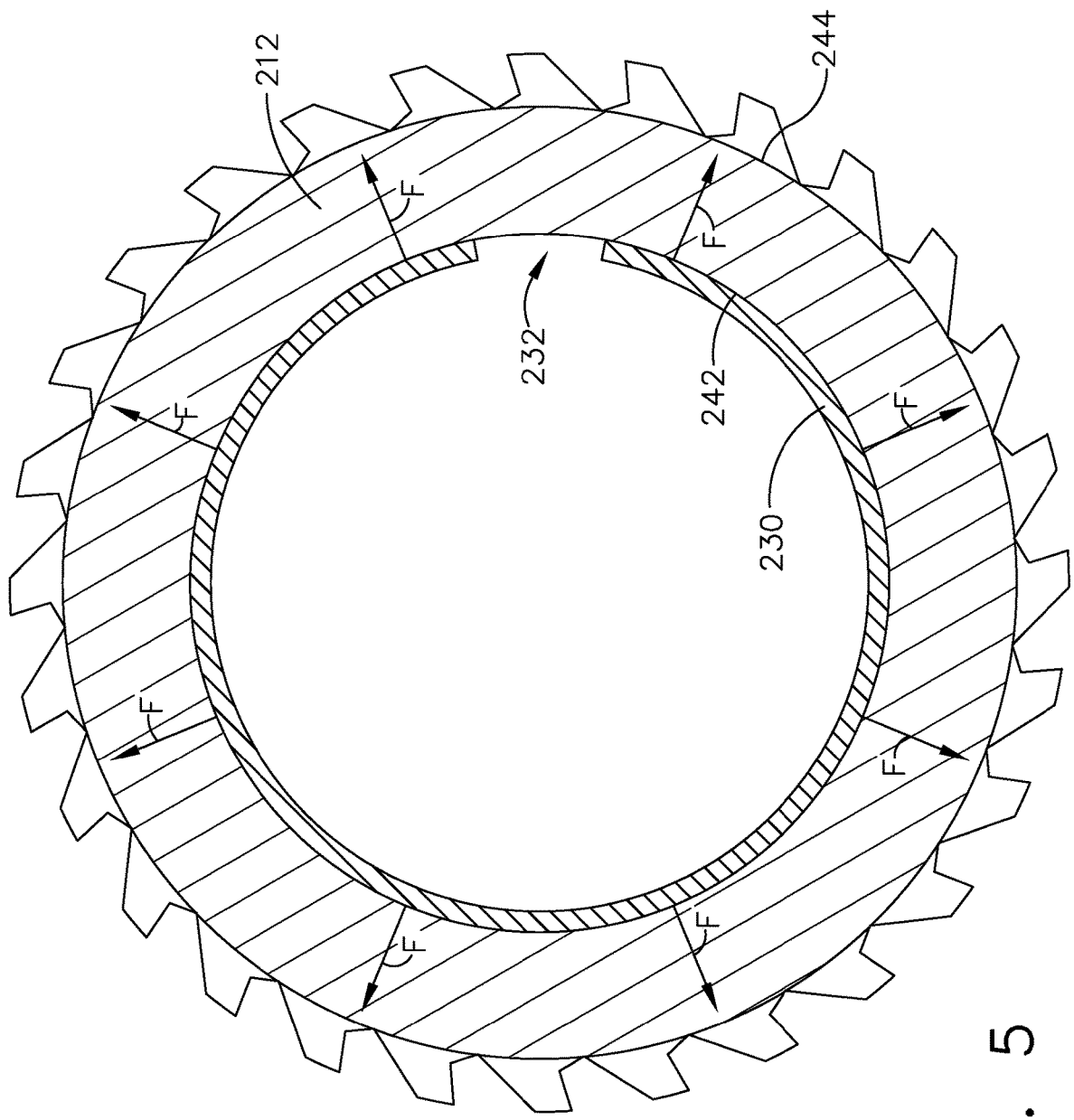
FIG. 5 is cross-sectional view of a planetary gear and damper along line IV-IV of FIG. 4.

While FIG. 4 illustrates two damper rings 230 axially spaced along the inner surface 242 of the outer ring 213 of planet gear 212, it is possible for the gear assembly 200 to include a single damper ring 230, or more than two damper rings 230, axially spaced along the inner surface 242. Therefore, the inner surface 242 can include one or more grooves 250 for engaging or aligning damper rings 230. The damper rings 230 can be spaced such that the plurality of rolling elements 216 are located between the damper rings 230. Additionally, the damper ring 230 can have cross-sections other than square as shown in FIG. 5, such as a round or rectangular cross-section. Furthermore, the damper ring 230 can extend axially along the inner surface 242 of the planet gear 212 and form a sleeve rather than multiple axially spaced damper rings 230. The sleeve can be a complicated sheet metal form.

Turning to FIG. 5, the outer ring 213 is shown with the damper ring 230 cut along line IV-IV of FIG. 4 to better illustrate the damper ring 230. Other components of the gear assembly 200 are not shown for ease of viewing. The damper ring 230 can be a split ring and include a split 232. Alternatively, the damper ring 230 can be in the form of a snap ring meaning that the damper ring 230 can apply a hoop force or an expansive force on the inner surface 242 of the outer ring 213. The hoop force is illustrated by force arrows, F, which exerts force against the inner surface 242 of the outer ring 213. The damper ring 230 can extend circumferentially in the range of about 200 degrees to about 360 degrees so that the hoop force can occur along a substantial portion of the at least one of the inner surface 242 of the outer ring 213.

A method of damping a roller bearing assembly in a planetary gear system 200 having a plurality of rolling elements 216 between inner and outer races can include applying a hoop force to one of the inner and outer races. The hoop force can be an expansive force. Furthermore, the hoop force can be applied by a damper ring 230 having a split 232 such as a split ring, which contacts one of the inner and outer races. The method can also include multiple split rings axially spaced along the inner surface of the outer ring 213.

Since the damper ring 230 is frictionally slidable along the inner surface 242 of the outer ring 213, it can adjust position during high speed rotation. In the case that the sun gear 211 is driving the gear assembly 200, the driving force of the sun gear 211 can exert a force that pulls the planet gear 212 in one or more directions, which can cause deformation of the planet gear 212. If the planet gear 212 and its corresponding damper ring 230 begin to deform in either a horizontal or vertical elongation direction, the damper ring 230 can frictionally adjust in order to keep a constant force on the inner surface 242 to help prevent deformation of the outer ring 213 of the planet gear 212 or other parts of the gear assembly 200 due to modal frequencies by frictionally removing energy from the system.

It should be appreciated that application of the disclosed design is not limited to turbine engines with fan and booster sections, but is applicable to turbojets and turbo engines as well. Benefits of aspects described herein can include adding robustness to the design of a gear assembly by reducing dynamic overloads on the gearbox, allowing the design of a lighter, more compact gearbox. The damper rings can reduce the vibratory response to planet modes at undesired frequencies by frictionally removing energy from the system. Due to the high speed at which the gear assembly operates, and the relative thin section of the planet gear, undesirable modes, can result and cause the outer ring to deform. The addition of the damper ring aims to counteract the modes by frictionally removing energy from the system, minimizing deformation within the gear assembly.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A gear assembly, comprising:
   an inner ring having an outer surface defining an inner race;
   an outer ring rotatable with respect to the inner ring and having an outer surface with a plurality of teeth and an inner surface defining an outer race circumscribing and confronting the inner race;
   a plurality of rolling elements located between and in contact with the inner and outer races; and
   at least one damper ring spaced from the plurality of rolling elements, provided on the inner surface of the outer ring, and facing the inner ring;
   wherein the at least one damper ring is frictionally slidable relative to the inner surface.

2. The gear assembly of claim 1 wherein the at least one damper ring is provided on at least one of the inner surface or a side wall of the outer ring.

3. The gear assembly of claim 2 further comprising a groove in the at least one of the inner surface or the side wall of the outer ring receiving the damper ring.

4. The gear assembly of claim 3 wherein the groove is in the form of an L-shape.

5. The gear assembly of claim 3 wherein the at least one damper ring is a split ring that applies a hoop force on the inner surface of the outer ring.

6. The gear assembly of claim 5 wherein the split ring comprises multiple split rings axially spaced along the inner surface of the outer ring.

7. The gear assembly of claim 5 wherein the hoop force occurs between about 200 degrees to about 360 degrees along the at least one of the inner surface of the outer ring.

8. The gear assembly of claim 1 wherein the at least one damper ring comprises one of a round or rectangular cross-section.

9. The gear assembly of claim 1 further comprising at least two damper rings axially spaced along the inner surface of the outer ring wherein the plurality of rolling elements are located between the at least two damper rings.

10. The gear assembly of claim 1, wherein the at least one damper ring is one of a split ring or sleeve.

11. The gear assembly of claim 10, wherein the at least one damper ring circumferentially extends between about 200 degrees and about 360 degrees.

12. A planetary gear system, comprising:
    a sun gear having a plurality of teeth;
    a ring gear having a plurality of teeth;
    at least one planet gear in mesh with and spacing the sun gear and ring gear, the planet gear comprising:
      an inner ring having an inner surface and an outer surface defining an inner race;
      an outer ring rotatable with respect to the inner ring and having an outer surface with a plurality of teeth and an inner surface defining an outer race circumscribing and confronting the inner race;
      a plurality of rolling elements located between and in contact with the inner and outer races; and
      at least one damper ring spaced from the plurality of rolling elements, provided on the inner surface of the outer ring, and facing the inner ring;
    wherein the at least one damper ring is frictionally slidable relative to the inner surface.

13. The planetary gear system of claim 12 further comprising a groove in the at least one of the inner surface or side wall of the outer ring receiving the at least one damper ring.

14. The planetary gear system of claim 13 wherein the groove is in the form of an L-shape.

15. The planetary gear system of claim 12 wherein the at least one damper ring is a split ring applying a hoop force on the inner surface of the outer ring.

16. The planetary gear system of claim 15 wherein the split ring comprises multiple split rings axially spaced along the inner surface of the outer ring.

17. The planetary gear system of claim 15 wherein the hoop force occurs between about 200 degrees to about 360 degrees along the at least one of the inner surface of the outer ring.

18. A method of damping a roller bearing assembly, in a planetary gear system, having an inner ring and an outer ring between which are provided a plurality of rolling elements, the method comprising applying a hoop force with a damper ring to an inner surface of the outer ring; and adjusting a position of the damper ring during high speed rotation by enabling the damper ring to be frictionally slidable along the inner surface of the outer ring.

19. The method of claim 18 wherein a split ring applies the hoop force by applying an expansive force contacting an outer race defined by an inner surface of the outer ring.

20. The method of claim 19 wherein the split ring applies the hoop force between about 200 degrees to about 360 degrees along the outer race.

* * * * *